United States Patent
Arsenault

(10) Patent No.: US 9,096,764 B2
(45) Date of Patent: Aug. 4, 2015

(54) TUNABLE PHOTONIC CRYSTAL COMPOSITION

(75) Inventor: Andre Arsenault, Toronto (CA)

(73) Assignee: OPALUX INCORPORATED, Toronto (CA)

(*) Notice: Subject to any disclaimer, the term of this patent is extended or adjusted under 35 U.S.C. 154(b) by 390 days.

(21) Appl. No.: 13/055,300

(22) PCT Filed: Jul. 23, 2009

(86) PCT No.: PCT/CA2009/001052
§ 371 (c)(1),
(2), (4) Date: May 26, 2011

(87) PCT Pub. No.: WO2010/009558
PCT Pub. Date: Jan. 28, 2010

(65) Prior Publication Data
US 2011/0233476 A1 Sep. 29, 2011

Related U.S. Application Data

(60) Provisional application No. 61/082,864, filed on Jul. 23, 2008, provisional application No. 61/109,956, filed on Oct. 31, 2008.

(51) Int. Cl.
*H01B 1/00* (2006.01)
*C09D 7/12* (2006.01)
*C09D 5/24* (2006.01)
*C09D 11/037* (2014.01)
*C09D 11/52* (2014.01)

(52) U.S. Cl.
CPC ........ *C09D 7/125* (2013.01); *C09D 5/24* (2013.01); *C09D 11/037* (2013.01); *C09D 11/52* (2013.01)

(58) Field of Classification Search
USPC .............. 252/586, 582–584, 500; 117/70
See application file for complete search history.

(56) References Cited

U.S. PATENT DOCUMENTS

| | | | |
|---|---|---|---|
| 6,271,899 B1* | 8/2001 | Lewis et al. | 349/86 |
| 2003/0122112 A1* | 7/2003 | Foulger et al. | 252/582 |
| 2004/0131799 A1* | 7/2004 | Arsenault et al. | 428/1.26 |

FOREIGN PATENT DOCUMENTS

| | | | |
|---|---|---|---|
| CA | 2660057 | | 2/2008 |
| WO | WO 2007/073393 A2 | | 6/2007 |
| WO | WO2008/017864 | * | 2/2008 |
| WO | WO 2008/017864 A1 | | 2/2008 |
| WO | WO 2008/055855 A2 | | 5/2008 |
| WO | WO2008/098339 | * | 8/2008 |
| WO | WO 2008/098339 | | 8/2008 |

OTHER PUBLICATIONS

Supplementary European Search Report dated Mar. 21, 2012 for EP Application No. EP 09 79 9911.
International Search Report for PCT/CA2009/001052 dated Nov. 18, 2009.
European Patent Office, Examination Report in European Patent Application No. 09799911.4 dated Nov. 9, 2012.
Office Communication issued in European Patent Application No. 09799911.4 dated Oct. 23, 2013.

* cited by examiner

*Primary Examiner* — Monique Peets
(74) *Attorney, Agent, or Firm* — Norton Rose Fulbright US LLP

(57) ABSTRACT

A tunable photonic crystal composition comprising: tunable photonic crystal particles having a polymer network with a periodic modulation of refractive indices, the polymer network having a reflectance wavelength, wherein the periodic modulation of refractive indices is responsive to an external stimulus and the reflectance wavelength is shifted in response to the external stimulus; and a carrier in which the particles are dispersed.

24 Claims, 8 Drawing Sheets

TUNABLE PHOTONIC CRYSTAL COMPOSITION

CROSS REFERENCE TO RELATED APPLICATIONS

This patent application claims priority to International Application No. PCT/CA2009/001052 filed on Jul. 23, 2009, which claims the benefit of U.S. Provisional Application No. 61/109,956, filed on Oct. 31, 2008, and U.S. Provisional Application No. 61/082,864, filed on Jul. 23, 2008 which is incorporated by reference.

TECHNICAL FIELD

The present disclosure relates to tunable photonic crystal-based compositions, including tunable photonic crystal particles suitable for such compositions.

BACKGROUND

Photonic crystals are materials having a periodic modulation in their refractive index (Yablonovitch, *Phys. Rev. Lett.*, 58:2059, 1987), giving rise to a photonic band gap or stop gap, in which the propagation of electromagnetic waves within certain ranges of wavelengths is inhibited or restricted. The spectral positions of these bands are dependent on the distance between the periodic modulations in the crystal. The reflected stop band wavelengths can appear in the reflectance spectrum as a distinct reflectance peak known as a Bragg peak. The crystal may have a one-, two-, or three-dimensional (3-D) periodic structure.

A 1-D photonic crystal has a periodic multilayer structure, also referred to as a Bragg mirror. Such a structure has a reflectance peak for incident light in only one direction—perpendicular to the layers. A 2-D photonic crystal has a modulation in only two dimensions. Such a structure has a reflectance peak for incident light in two directions—along the plane of the repeating units. A 3-D photonic crystal has an ordered periodicity in all three dimensions. Such a structure has reflectance peaks for incident light in all directions. Methods for manufacturing these photonic crystals include etching, and in the case of a 3-D photonic crystal, self-assembly of microparticles. Such photonic crystals may also be inverse crystals, in which the periodic structure of the crystal comprises a periodic array of voids.

An inverse photonic crystal can be made using a templating strategy. For 3-D inverse photonic crystals, 3-D photonic crystals formed by microparticles are used as a template for an infiltrating material. When the template is removed, the result is an inverse photonic crystal having an ordered array of voids. Such a templating strategy is disclosed in U.S. Pat. No. 6,261,469. The photonic crystal disclosed in this reference is in block form, which may not be suitable in many applications.

Because of the sensitivity of a photonic crystal, slight changes in the refractive index or lattice spacing result in detectable changes in the reflected light. This is useful where the refractive index or the lattice spacing of the photonic crystal is modulated in response to external stimuli or can be controlled. Examples of such applications are given in U.S. Patent Application Publication No. 2004/0131799, PCT Application Publication No. 2008/098339, and U.S. Patent Application Publication No. 2009/0034051. Deformable photonic crystal are also known, comprising non-close-packed spheres embedded in an hydrogel or elastomer matrix, for example as discussed in U.S. Pat. No. 6,544,800 to Asher, U.S. Pat. Nos. 5,266,238 and 5,368,781 to Haacke et al., by Holtz et al. in *Nature* 389:829-832, by Foulger et al. in *Advanced Materials* 13:1898-1901, by Asher et al. in *Journal of the Material Chemical Society* 116:4997-4998, and by Jethmalani et al. in *Chemical Materials* 8:2138-2146.

Examples of photonic crystal structures that can respond to external stimuli include colloidal photonic crystals in the form of optical films (Busch et al., *Phys. Rev. E*, 58:3896, 1998; Xia et al., *Adv. Mater.*, 12:693, 2000). The reflectance wavelength ranges of these materials are highly sensitive to changes in the external environment, optical characteristics, or the structure of the photonic crystal.

The use of 3-D photonic crystals as color particles, flakes or pigments has been previously proposed. An advantage of photonic crystal pigments, flakes or particles is that they can be dispersed in inks or paints, facilitating application of a photonic crystal film to a surface. Coatings of photonic crystal pigments, flakes or particles may reflect wavelengths in a wider viewing angle, due to different or randomized orientations of the particles in an ink or paint. Use of such photonic crystal particles in inks or paints have been suggested. U.S. Pat. No. 6,756,115 describes the use of 3-D colloidal photonic crystal particles for color pigments. U.S. Patent Publication No. 2006/0288906 describes a process for producing photonic crystal particles usable as pigments or in inks. PCT Publication No. 2004/104115 describes a multi-layer coating for a substrate surface comprising a layer having 3-D photonic crystals as pigments. These applications provide inks, pigments and coatings having an opalescence effect. The photonic crystals in these inks, pigments and coatings are designed to reflect a certain desired wavelength of light. Multilayer diffractive pigments based on diffraction gratings have also been suggested, for example in U.S. Pat. No. 6,841,238.

Other pigments or inks having optical effects have also been suggested. U.S. Pat. No. 6,695,905 suggests use of optically variable pigments based on Fabry-Perot resonance. U.S. Pat. No. 6,749,777 suggests use of diffractive pigment flakes for optical effects.

It is desirable to have a photonic crystal particle, ink or pigment in which the reflected wavelength may be tuned, so as to be responsive to external stimuli or to be controllable. It is also desirable to have a photonic crystal pigment, flake or particle that can be used in standard inks, coatings and paints, in a variety of applications.

SUMMARY

In some aspects, there is provided a tunable photonic crystal composition comprising: tunable photonic crystal particles having a polymer network with a periodic modulation of refractive indices, the polymer network having a reflectance wavelength, wherein the periodic modulation of refractive indices is responsive to an external stimulus and the reflectance wavelength is shifted in response to the external stimulus; and a carrier in which the particles are dispersed.

In some examples, the periodic modulation may expand or contract in response to the external stimulus.

In some examples, the periodic modulation of refractive indices may arise from a three-dimensional ordered array of voids in the polymer network.

In some examples, the periodic modulation of refractive indices may arise from periodic multilayer of material having different refractive indices.

In some examples, the polymer network may be an electrically active polymer network comprising an electroactive polymer, and the external stimulus may be an electrical stimulus.

In some examples, the electroactive polymer may be selected from the group consisting of: polyferrocenylsilanes, polythiophenes, polypyrroles, polyanilines, polyphenylene vinylenes, polyacetylenes, polyfluorenes, polyphenylenevinyidenes, polyacetylenes, conducting polymers, conjugated polymers, metallopolymers, copolymers incorporating such polymer types, polyvinylidene difluoride, and combinations thereof.

In some examples, the polymer may contain cross-links selected from the group consisting of: covalent bonds, ionic bonds, polar covalent bonds, chemical bonds, physical bonds, dispersion interactions, Van Der Waals interactions, nanoparticle interactions, surface interactions, hydrogen bonds, coordination bonds, electrostatic interactions, hydrophobic interactions, fluorophobic interactions, phase-separated domains, or combinations thereof.

In some examples, the polymer may contain cross-links that are electrically conducting or electrically insulating.

In some examples, the polymer may comprise redox active groups.

In some examples, the polymer network may be an elastic polymer network comprising an elastic polymer, and the external stimulus is a mechanical stimulus.

In some examples, the polymer may be selected from the group consisting of: polystyrenes, polymethacrylates, polyacrylates, polyurethanes, polyesters, polyethylenes, polypropylenes, polyvinylchlorides, polyisoprene, polybutadiene, polydienes, waxes, and copolymers or combinations thereof.

In some examples, the polymer may be an elastomer having a monomer or pre-polymer selected from the group consisting of: methacrylic acid esters, acrylic acid esters, polyisoprene, polybutadiene, polyurethane precursors, crosslinkable polyethers, and mixtures thereof.

In some examples, the monomer or pre-polymer may be the methacrylic acid ester, and the methacrylic acid ester is selected from the group consisting of: ethylhexyl methacrylate, lauryl methacrylate, butyl methacrylate, methyl methacrylate, stearyl methacrylate, butoxyethyl methacrylate, and mixtures thereof.

In some examples, the monomer or pre-polymer may be the acrylic acid ester, and the acrylic acid ester is selected from the group consisting of: butoxyethyl acrylate, hydroxyethyl acrylate, 2-carboxyethyl acrylate, stearyl acrylate, lauryl acrylate, butyl acrylate, hexyl acrylate, and mixtures thereof.

In some examples, the monomer or pre-polymer may be the crosslinkable polyether, and the crosslinkable polymer is selected from the group consisting of: polyether diacrylates, polyether acrylates, polyether dimethacrylates, polypropylene glycol diacrylates, polypropylene glycol dimethacrylates, polypropylene glycol acrylates, polypropylene glycol methacrylates, polyethylene glycol diacrylates, polyethylene glycol dimethacrylates, polyethylene glycol acrylates, polyethylene glycol methacrylates, oligoethylene glycol diacrylates, oligoethylene glycol dimethacrylates, oligoethylene glycol acrylates, oligoethylene glycol methacrylates, oligopropylene glycol diacrylates, oligopropylene glycol dimethacrylates, oligopropylene glycol acrylates, oligopropylene glycol methacrylates and mixtures thereof.

In some examples, the carrier may comprise at least one selected from the group consisting of: a binder, a solvent, an additive, a filler, and a curing agent.

In some examples, the composition may comprise the additive and the additive may be selected from the group consisting of: a surfactant, an anti-foaming agent, a surface-active agent, a leveling agent, a curing initiator, a pH modifier, a humectant, a wetting agent, a biocide, a rheology modifier, a filler, an electrically-conductive agent, and combinations thereof.

In some examples, the carrier may comprise at least one electrically-conductive component.

In some examples, the carrier may comprise at least one mechanically-deformable component.

In some examples, the carrier may comprise a binder and a solvent, and the composition comprises the tunable photonic crystal particle in the range of about 10 wt % to about 30 wt %, the binder in the range of about 10 wt % to about 30 wt %, and the solver in the range of about 40 wt % to about 80 wt %.

In some examples, the carrier may comprise a binder and a solvent, and the composition comprises up to about 10 wt % of the tunable photonic crystal particle, up to about 45 wt % of a binder, and up to about 45 wt % of a solvent.

In some examples, the carrier may comprise a surfactant and the composition further comprises up to about 5 wt % of a surfactant.

In some examples, the external stimulus may be selected from the group consisting of: a mechanical stimulus, a chemical stimulus, and an electrical stimulus.

In some examples, the composition may be an ink, a coating, or a paint.

In some examples, the composition may be suitable for application on an electrode surface.

In some aspects, there is provided a method of manufacturing a tunable photonic crystal particle comprising: forming a template having a periodic structure, the template having a reflectance wavelength; infiltrating the template with a polymer precursor mixture; curing the polymer precursor mixture to form a polymer network, the polymer network also having the reflectance wavelength; removing the template from the polymer network; and comminuting the polymer network to form particles; wherein the polymer network is responsive to an external stimulus, and the reflectance wavelength is shifted in response to the external stimulus.

In some examples, the method may further comprise purifying the particles.

In some examples, the method may further comprise dispersing the particles in a carrier.

In some examples, the external stimulus may be selected from the group consisting of: a pressure stimulus, a chemical stimulus, and an electrical stimulus.

In some examples, the template may have a three-dimensional periodic structure.

In some aspects, there is provided a method of manufacturing a tunable photonic crystal composition comprising the method described above and further comprising: dispersing the particles in a carrier.

For the composition and method described above, the tunable photonic crystal particle may be responsive to an external stimulus such as an electrical stimulus or a mechanical stimulus.

BRIEF DESCRIPTION OF THE DRAWINGS

Aspects of the present disclosure will be discussed in detail below, with reference to the drawings in which.

DETAILED DESCRIPTION

Figure 1:
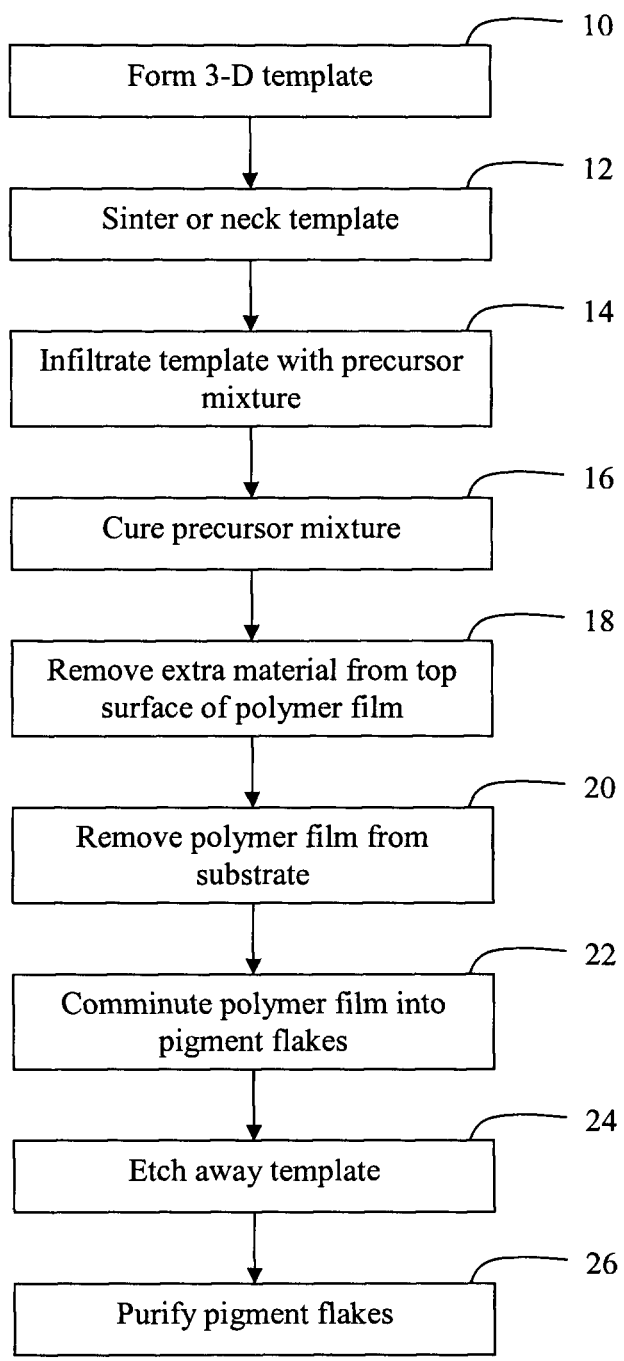
FIG. 1 is a flowchart showing steps in an example method of manufacturing a tunable photonic crystal particle.

All examples and embodiments discussed in the present application are for purposes of illustration only and are not intended to be limiting.

The tunable photonic crystal particle and composition disclosed herein are considered "tunable" in the sense that the wavelength or range of wavelengths reflected by these particles and compositions may be shifted in response to external stimuli. Hence, in addition to creating an opalescent effect, such particles and compositions may also be used in sensor, indicator, authentication, or display applications, among others.

Tunable photonic crystal pigments, flakes or particles may be based on 1-D, 2-D or 3-D tunable photonic crystals, including inverse 1-D, 2-D or 3-D tunable photonic crystals. In particular, tunable photonic crystal particles may be based on known tunable photonic crystals, for example those described in U.S. Patent Application Publication No. 2004/0131799, PCT Application Publication No. 2008/098339, and PCT Application No. PCT/CA2009/000745. Tunable photonic crystals that are suitable for making particles may be responsive to electrical stimulation or mechanical stimulation (e.g., compression), among others. The wavelength reflected by a photonic crystal is dependent on the periodic structural modulation of the refractive index. Hence, the wavelength reflected by a photonic crystal may be shifted by changes in the photonic crystal structure (e.g., the lattice spacing), in the refractive index, or in any other or all components of the photonic crystal. These particles may be applied on a suitable substrate (e.g., an electrode for electrically tunable particles) either directly or in combination with a carrier (e.g., to form an ink, a coating or a paint), to make the reflected wavelength controllable.

In an example, the tunable photonic crystal pigment, flake or particle is electrically tunable. That is, the photonic crystal particle is responsive to electrical stimulation. The photonic crystal particle may include metal atoms having different electronic configurations or states, which may be oxidized or reduced. By controlling the amount of oxidation or reduction in the metal atoms, the overall charge of the photonic crystal is controlled. This causes an inflow or outflow of surrounding electrolytes and/or solvent into or out of the photonic crystal particle, resulting in the crystal particle expanding or contracting. This expansion or contraction changes the lattice spacing in the crystal particle, thus shifting the wavelength of light reflected from the crystal particle. In some examples, the photonic crystal particle comprises an electroactive polymer forming a polymer network.

Where the tunable photonic crystal particle is based on a 1-D photonic crystal, the tunable photonic crystal particle may comprise a periodic alternating layers of a responsive material and an unresponsive or less responsive material, in which the lattice spacing is changed by changes in the responsive material (e.g., expansion or contraction of a responsive polymer material). These layers may also be made of microparticles or nanoparticles. In the case of microparticles or nanoparticles, the particles may form organized layers or films through self-assembly processes. The micro- or nanoparticles may have cross-sectional dimensions ranging in size from about 60 nanometers to about 100 micrometers, or may be smaller, ranging in size from about 1 nanometer to about 150 nanometers. The 1-D photonic crystal may have alternating layers of different materials in flat sheets, alternating layers of micro- or nanoparticle materials, or alternating layers of materials in flat sheets and micro- or nanoparticle materials. Other common structures for 1-D photonic crystals would also be suitable.

Where the tunable photonic crystal particle is based on a 3-D photonic crystal, the tunable photonic crystal particle may comprise a polymer network with an embedded ordered array of microparticles or an ordered array of voids, the lattice spacing of which changes as the polymer network changes (e.g., expansion or contraction), in response to an external stimulus.

The photonic crystal pigment, flake or particle may also respond to external stimulation by a change in its refractive index. For example, in the case of an electrically-tunable photonic crystal particle, a change in the electronic configuration of metal atoms in a component of the photonic crystal particle may result in a change in the refractive index of that component. This may result in a shift of the reflected wavelength.

In another example, the photonic crystal pigment, flake or particle is tunable by mechanical stimulation. That is, the reflected wavelength may be shifted in response to a mechanical stimulus, including mechanical deformation such as compression of the photonic crystal particle. The photonic crystal particle may have elastic or compressible components, such that compression or deformation of the photonic crystal particle results in a change in its lattice spacing. This gives rise to a change in the wavelength reflected. Where the tunable photonic crystal particle is based on a 1-D photonic crystal, the tunable photonic crystal particle may comprise periodic alternating layers of a compressible material and an incompressible or less compressible material, in which the lattice spacing is changed by compression of the compressible material (e.g., a compressible polymer). Where the tunable photonic crystal particle is based on a 3-D photonic crystal, the tunable photonic crystal particle may comprise a compressible or deformable polymer network with an embedded ordered array of incompressible or less compressible microparticles or an ordered array of voids, the lattice spacing of which is modulated as the polymer network is mechanically stimulated, for example in compression.

The reflectance and tunable properties of a photonic crystal are not dependent on the size of the photonic crystal. Hence, reducing in size a tunable photonic crystal into pigments, particles or flakes for use in inks, coatings or paints does not impair the ability of the crystal to reflect selected wavelengths nor the ability to be tuned by external stimuli. However, providing particles of a size having at least two layers of lattice spacing in at least one dimension may ensure the necessary reflective properties are achieved and thus the desired reflectance is obtained.

Tunable photonic crystal pigments, flakes or particles may be incorporated into a composition, such as standard ink, coating or paint compositions. The formulations and components of the ink, coating or paint compositions may be selected to preserve or enhance the tunable behavior of the particles. For example, where the particle is electrically tunable, the composition may include electrically conductive carriers, including electrically conductive binders or additives, to improve the tunable response of the particle. The composition may be designed to permit detection of changes in the reflectance wavelength of the particles, for example by ensuring that the carriers, including binders or additives, are relatively transparent.

The orientation of the particles the composition may be random or may be substantially ordered. Setting of the composition may be by drying or curing. Ordering of the particles may be controlled by controlling the composition, the method of application and/or setting conditions. Quick setting of the composition may result in relatively random particle orientation, while slower controlled setting may result in substantially ordered particle orientation. Other methods of controlling particle orientation include varying the humidity, temperature, and/or airflow during setting, the use of shear force, applying an electrical or magnetic field, varying the composition (e.g., by varying the carrier or percentage of particles in the composition), or varying the homogeneity of particle dispersion in the composition. Orientation of the particles may affect the intensity of the wavelength reflected by the composition. Reflection of wavelengths from a photonic crystal is typically angle-dependent, since the lattice spacing is different along different dimensions of the crystal. Thus, a set composition, such as a set ink, coating or paint, having substantially ordered particles may reflect a desired wavelength in a relatively narrow range of viewing angles. On the other hand, a set composition having relatively random particle orientations may reflect a desired wavelength for a wider range of viewing angles.

Further details of the particle manufacture, structure, composition, and applications are provided below. These descriptions may refer to examples or embodiments, which are provided for the purpose of illustration only, and is not intended to be limiting.

Method of Manufacture

An example method of manufacturing a tunable photonic crystal particle is described here for the purpose of illustration, and is not intended to be limiting. Specifically, a method of manufacturing a tunable 3-D photonic crystal particle is described. However, it should be understood that the manufacturing steps described below may be generalized to apply to all 1-D, 2-D and 3-D photonic crystal particles.

A tunable 3-D photonic crystal film is first formed on a suitable substrate. A suitable substrate may be, for example, glass or plastic material. The plastic material may be flexible or stretchable, which may assist in later removal of the film.

In particular, a method of manufacture will be described for making tunable photonic crystal particles (e.g., electrically- or mechanically-tunable particles) based on an inverse photonic crystal. Manufacture of electrically- or mechanically-tunable photonic crystals having different structures and configurations are described in U.S. Patent Application Publication No. 2004/0131799, PCT Application Publication No. 2008/098339 and PCT Application No. PCT/CA2009/000745, and the steps described therein may form the basis of manufacturing steps for a tunable photonic crystal pigment, flake or particle.

Reference is now made to FIG. 1, which is a flowchart showing steps in an example method of manufacture.

At step 10, a template for the inverse photonic crystal is first formed using techniques known in the art. The template may be a close-packed 3-D structure. Any suitable substrate may be used. Possible substrates include paper, glass, plastic, metals, and ceramics. The template may be self-assembled from microparticles, or it may be etched, for example out of a solid layer. Self-assembly methods include evaporation-induced self-assembly (EISA), isoconvective heating, sedimentation, shear assembly, parallel plate confinement, spin-coating, dip-coating, and drop-casting. Methods of sphere deposition are disclosed in U.S. Pat. No. 6,858,079. Such disclosed methods include the steps of: synthesizing monodisperse silica spheres; purifying the silica spheres; and self-assembling the silica spheres into a plurality of ordered, planar layers on a substrate. Microspheres may be synthesized according to a modified Stöber process. In an example embodiment, the microspheres may have diameters in the range of about 150-900 nm.

Microparticles suitable for making the template include, spheres, ellipsoids, rods, sphere containing polyhedra, cubes, and polyhedra, having cross-sectional dimensions from about 60 nanometers to about 100 micrometers. The microparticles may be made from materials including insulators, polymers, metals, and semiconductors. In an example embodiment, the microparticles are monodisperse microspheres (3-5%) made of silica having diameters from about 60 nanometers to about 100 micrometers. The microparticles may also be made of a polymer material, such as polystyrene and polymethacrylate.

At step 12, the microparticles may be sintered or necked together to increase the stability of the structure, and to facilitate later etching of the template. In an example embodiment, an overnight treatment using tetramethoxysilane vapour, results in necking between microparticles. Other suitable necking methods may be used, including necking using silicon tetrachloride vapor. Interconnection of the microparticles in the template by necking will result in interconnected voids in the inverse photonic crystal. Interconnections may aid in later etching away the microparticles. Microparticles that are not removed may affect the mechanical and optical properties of an inverse photonic crystal. Methods of necking the microspheres by vapour treatment include those disclosed in U.S. Patent Application Publication No. 2004/0062700. Disclosed methods include forming necking using a homogeneous layer of uniform and controllable thickness of a metal oxide. This metal oxide layer is grown in a layer-by-layer process and is chemically bonded to the microparticle surface and serves to enhance the mechanical stability of the template, in addition to acting to control the pore size or void volume between the microparticles in the lattice. Necking serves to control the degree of connectivity of the microparticles making up the template and, consequently, the pore size, filling fraction, mechanical stability and optical properties of the template, without disrupting its long range order and without the deleterious effects of lattice contraction induced cracking observed in conventional necking methods based on thermal sintering. Such control of the template structure may correspond to control of the resultant inverse photonic crystal made from that template. Necking is also possible by thermal annealing, as disclosed in U.S. Pat. Nos. 6,261,469 and 6,517,763.

At step 14, the template is then infiltrated with a polymer precursor, which may be a mixture of monomers or prepolymers with cross-linkers and initiators. The infiltration may be by way of melt infiltration, solution infiltration, gas-phase infiltration, electrophoresis, sublimation, or other suitable methods. The composition of the precursor mixture may be selected to give a desired viscosity, in order to ensure the template is fully infiltrated. When designing the precursor mixture or selecting any component, the ability of the mixture to infiltrate into the template may be worth considering. Inability of the precursor mixture to fully infiltrate the template may result in unintended air bubbles or voids in the final product. While some air bubbles (other than the intended voids) within the inverse photonic crystal may be acceptable, the presence of air bubbles may affect the performance of the resultant photonic crystal. The degree of infiltration may be dependent on the molecular weight and degree of existing cross-links in the monomer and/or pre-polymer mixture. Infiltration may be aided by heat, agitation, vacuum, pressure, dilution, or other known techniques. For practical purposes, the template does not need to be completely infiltrated, and the presence of air bubbles in the final photonic crystal may be acceptable.

The mixture may be a liquid, having a low vapor pressure at ambient conditions (that is, the evaporation of the mixture components is not such that it changes the ratios of the components within the mixture), stable in an uncross-linked state (that is, it will not spontaneously crosslink before infiltration), and is cross-linkable (that is, the mixture does not contain any inhibitors that may prevent cross-links from forming or the initiator from functioning).

The amount of cross-linkers and initiators in the mixture may be selected to achieve a desired amount of cross-linking in the cured polymer. Possible precursor compositions include a mixtures including about 0-100 weight % monomer, 0-100 weight % cross-linker or cross-linkable polymer, and 0-20 weight % initiator. In some compositions, the cross-linker itself may be the basis for the polymer, thus forgoing the need for a monomer. The density of cross-links in the cured polymer may be controllable by the proportion of cross-linker in the precursor mixture. The porosity of the cured polymer may be controlled by including in the precursor mixture an inert substance, such as a solvent, which can be removed after curing, for example through evaporation. A variety of polymeric and non-polymeric additives may be added to modify the properties of the resulting photonic crystal material.

For a photonic crystal particle that is electrically tunable, the particle may comprise a polymer material that is responsive to electrical stimulation, such as an electroactive polymer. For example, where the particle is based on a 3-D inverse photonic crystal, the particle may comprise an electroactive polymer network. The electrical response of the electroactive polymer may be due to the presence of atoms or chemical groups on the polymer—either on the polymer backbone itself, as a functional group or chain hanging off the backbone, or mixed with but not bound to the polymer—which respond to an electrical field or current. These may be atoms or groups that can be oxidized or reduced, such as iron atoms or thiophene groups (e.g., as found in the common commercial conducting polymer polythiophene), so that the polymer can maintain an electrical charge even after the electric current is removed. In other examples, the polymer includes groups which respond to the electric field, but do not oxidize or reduce. Such groups include ionic groups which would move within the electric field, but tend to drift back to their original positions once the field is removed. In other examples, the polymer may have piezoelectric properties (e.g., the polymer may be polyvinylidene difluoride), such that the polymer structure itself may exhibit a change in dimensions under the influence of an electrical stimulus such as an electric field.

Possible metal atoms that may be used in an electroactive polymer include: titanium, vanadium, chromium, manganese, iron, cobalt, nickel, copper, niobium, molybdenum, ruthenium, rhenium, platinum, palladium, rhodium, zinc, and combinations thereof. These metal atoms may be chemically integrated into the polymer, and they may be connected together directly and/or through linking units. The direct connections or linking units themselves may provide certain chemical, physical, electrochemical, optical and/or electronic properties to the polymer. Possible linking units include: substituted or unsubstituted carbanions, conjugated carbanions, linear olefins, cyclic olefins, acetylenes, phosphines, amines, carbonyls, carbenes, alkoxides, and combinations thereof. The metal atom may also have side-chain ligands including: substituted or unsubstituted carbanions, conjugated carbanions, linear olefins, cyclic olefins, acetylenes, phosphines, amines, carbonyls, carbenes, alkoxides, fullerenes and combinations thereof.

The polymer may be a metallopolymer. One example of a metallopolymer is polyferrocenylsilane (PFS) gel. PFS is a polymer whose main chain is composed of alternating substituted silicon atoms and ferrocene groups connected by the 1- and 1'-positions of the ferrocenyl cyclopentadienyl rings. It may be obtained in high molecular weight via a number of methods, including transition metal catalyzed ring-opening-polymerization (ROP) or anionic ROP (Foucher et al., *J. Am. Chem. Soc.* 1992, vol. 114 p. 6246). Each of these described methods could be scalable and reproducible to larger quantities.

The polymer may be formed from a metal-containing monomer, oligomer or pre-polymer, for example bridged metallocenophanes. Possible bridged metallocenophanes include: substituted sila-1-ferrocenophanes, such as dialkyl-sila-1-ferrocenophanes, alkylalkoxysila-1-ferrocenophanes, dialkoxysila-1-ferrocenophanes, cycloalkylsila-1-ferrocenophanes, diarylsila-1-ferrocenophanes, alkylarylsila-1-ferrocenophanes, alkylalkenylsila-1-ferrocenophanes, alkylalkynylsila-1-ferrocenophanes, and combinations thereof. A metal-containing crosslinker may be used, for example: cyclobutylsila-1-ferrocenophane, sila-1,1'-diferrocenophane, 1,2-bis(methylsila-[1]-ferrocenophane)acetylene, 1,4-bis(methylsila-[1]-ferrocenophane)benzene, bis(methylsila-[1]-ferrocenophane)-1,4-diethynylbenzene, 1,2-bis(methylsila-[1]-ferrocenophane)ethane, and combinations thereof.

Other suitable polymers may include: polyferrocenylsilanes, polythiophenes (e.g., polyethylenedioxythiophene complex with polystyrenesulfonate), polypyrroles, polyanilines, polyphenylene vinylenes, polyacetylenes, polyfluorenes, polyphenylenevinyidenes, polyacetylenes, conducting polymers, conjugated polymers, metallopolymers, polyvinylidene difluoride, copolymers incorporating such polymer types, and combinations thereof. These polymers may be substituted or unsubstituted.

The polymer network may comprise linear polymer chains, or may contain a given density of cross-linking groups in order to provide a cross-linked polymer network. These crosslinks may be, for example, based on covalent bonds, ionic bonds, polar covalent bonds, chemical bonds, physical bonds, dispersion interactions, Van Der Waals interactions, nanoparticle interactions, surface interactions, hydrogen bonds, coordination bonds, electrostatic interactions, hydrophobic interactions, fluorophobic interactions, phase-separated domains, or combinations thereof. The density and distribution of crosslinks throughout the polymer may be selected to provide the polymer with certain stiffness or flexibility. For example, a higher density of crosslinks may result in a stiffer polymer material and may result in a smaller and/or slower response to external stimuli. The crosslinks may also be electrically conductive or electrically insulating.

In an example, the polymer material may be a polyferrocenylsilane bearing pendant vinyl groups, which is crosslinked using a multi-functional thiol in the presence of an activated radical initiator.

For a photonic crystal particle that is mechanically tunable, the particle may comprise a polymer material that is responsive to mechanical stimulation, such as a compressible or deformable polymer or elastomer. For example, where the particle is based on a 3-D inverse photonic crystal, the particle may comprise compressible or mechanically deformable polymer network. Suitable example polymers include polystyrenes, polymethacrylates, polyacrylates, polyurethanes, polyesters, polyethylenes, polypropylenes, polyvinylchlorides, polyisoprene, polybutadiene, polydienes, waxes, and copolymers or combinations thereof. Specific polymers include the monomers and pre-polymers listed hereinafter in respect of the elastomers. Elastomers can generally be characterized by cross-linked chains. To make the chain, many monomers may be polymerized together. They are amorphous polymers existing above their glass transition temperature, so that considerable segmental motion is possible. At ambient temperatures elastomers are thus usually relatively soft (E approximately equal to 3 MPa) and deformable. Their primary uses are for seals, adhesives and molded flexible parts. Elastomers are usually thermosets (that is, requiring vulcanization) but may also be thermoplastic. The long polymer chains cross-link during curing. The elasticity is derived from the ability of the long chains to reconfigure themselves to distribute an applied stress. The covalent cross-linkages ensure that the elastomer will return to its original configuration when the stress is removed. As a result of this extreme flexibility, elastomers can typically reversibly extend from 5-700%, depending on the specific material. Without the cross-linkages or with short, uneasily reconfigured chains, the applied stress would result in a permanent deformation.

The polymer may be formed from a monomer and/or pre-polymer selected from the group consisting of methacrylic acid esters, acrylic acid esters, polyisoprene, polybutadiene, polyurethane precursors, crosslinkable polyethers, and mixtures thereof. In the case of a methacrylic acid ester, it may be selected from the group consisting of ethylhexyl methacrylate, lauryl methacrylate, butyl methacrylate, methyl methacrylate, stearyl methacrylate, butoxyethyl methacrylate, and mixtures thereof. In the case of an acrylic acid ester, it may be selected from the group consisting of butoxyethyl acrylate, hydroxyethyl acrylate, 2-carboxyethyl acrylate, stearyl acrylate, lauryl acrylate, butyl acrylate, hexyl acrylate, and mixtures thereof. In the case of a crosslinkable polyether, it may be selected from the group consisting of polyether diacrylates, polyether acrylates, polyether dimethacrylates, polypropylene glycol diacrylates, polypropylene glycol dimethacrylates, polypropylene glycol acrylates, polypropylene glycol methacrylates, polyethylene glycol diacrylates, polyethylene glycol dimethacrylates, polyethylene glycol acrylates, polyethylene glycol methacrylates, oligoethylene glycol diacrylates, oligoethylene glycol dimethacrylates, oligoethylene glycol acrylates, oligoethylene glycol methacrylates, oligopropylene glycol diacrylates, oligopropylene glycol dimethacrylates, oligopropylene glycol acrylates, oligopropylene glycol methacrylates and mixtures thereof. Other polymers may be used. A wide variety of suitable polymerizable monomers and crosslinkers are available from Sartomer Company, Inc. A suitable polymer may have a network structure, and a glass transition temperature lower than its operational temperature. Other possible materials are disclosed in U.S. Pat. No. 6,946,086.

The cross-linking agent may be selected from the group consisting of dimethacrylates, trimethacrylates, tetramethacrylates, diacrylates, triacrylates, and tetraacrylates. The cross-linking agent is typically selected based on the monomers or pre-polymers used.

Possible initiators include photoinitiator (e.g., where curing is initiated by UV light) and thermal intiators (e.g., where curing is initiated by applying heat). The photoinitiator may be phenylbis(2,4,6-trimethylbenzoyl)phosphine oxide. If a thermal initiator is used, it may be dicumylperoxide. The initiator is typically selected based on the monomers or pre-polymers and the cross-linking agent.

At step 16, once the template is infiltrated, the precursor is cured by ultraviolet (UV) or other means to form a polymer network. Other possible curing methods include air-curing, heat, electron beam, and other types of radiation. If the curing method is by using an electron beam, it may not be necessary to include initiators and/or cross-linkers in the precursor mixture.

At step 18, extra polymer material may be removed from the surface of the template, such as by mechanical peeling or abrading from the upper surface. It may be possible to control the amount of precursor infiltrated into the template, such that any extra polymer material on the surface of the template is minimized or negligible and this step may be omitted. For example, the amount of precursor dispensed into the template may be controlled by an automatic dispenser. It may be possible to remove any extra precursor material prior to curing. For example, the template may be covered with a top-sheet, which is then pressed onto the template, to squeeze out extra precursor material or prevent extra precursor material from infiltrating the template; or any extra precursor material may be scraped off the top of the template. The top-sheet may be a mylar material that has been plasma-treated. The top-sheet may be the same material as the bottom substrate. Plasma treating the top-sheet may allow better adhesion of the precursor material to the sheet. Alternatively, the top-sheet may be designed such that the cured polymer as well as the template transfer entirely to the top-sheet. In this case the excess polymer layer would remain underneath the infiltrated template and be thus removed without affecting the properties of the cured material.

At step 20, the film with the template still embedded is removed from the substrate. This may be done, for example, by mechanically scraping off from the substrate using a blade. Where the substrate is a polymer or elastic material, the film may be removed by stretching and releasing the substrate or sharply bending the substrate, causing film to break off or otherwise detach from the substrate. The film may also be simply floated off the substrate, for example in a bath of distilled water.

Once released from the substrate, at step 22, the film can be ground up or milled into flakes or particles for use in a composition, such as an ink, a coating or a paint, using any suitable method. If the film is scraped off the substrate, the act of scraping may already break the film apart into flakes or particles, but further communication, such as by grinding or milling, may be done to reduce the size of the flakes or particles so as to be suitable for use in inks, coatings or paints. The particles may be repeatedly ground or milled to reduce the size of the particles, depending on the desired application. For example, the particles may be reduced to about 15 μm in diameter, which is a common size for ink or paint particles. Milling of the particles may be done using known processes for milling conventional pigments in inks. In general, there is no limit on the size of the particles, however there should be at least two layers of lattice spacing in at least one dimension for a reflection peak. Typical particles may range in size from the order of 1 μm to the order of about 200 μm. Grinding or milling may be assisted by dispersing the particles in a carrier such as an aqueous solution or a solvent, or may be performed dry (i.e., without any aqueous solution or solvent). Other communication techniques may be suitable, including cryomilling and ultrasonic treatment.

At step 24, the template may be etched away using techniques known in the art, for example by introducing hydrofluoric acid. For example, where the template comprises silica spheres, they may be etched by hydrofluoric acid, as taught by Blanco et al. in *Nature* 405 (6785):437-440 (May 25, 2000). They may also be etched by sodium hydroxide, as taught by Iler in *The Chemistry of Silica: Solubility, Polymerization, Colloid and Surface Properties and Biochemistry of Silica*, published by Wiley-Intersciences (May 1979). In examples template comprises polymer spheres, they may be dissolved away by various polymer solvents, as taught by Candau et al. in *An Introduction to Polymer Colloids,* 1st edition, published by Springer (Dec. 31, 1989). The template may alternatively be etched away prior to releasing the film from the substrate, again using techniques known in the art. It may be desirable to etch away the template after the film is reduced to flakes or particles, to increase the surface of the template exposed to the etching agent, ensuring that all of the template is etched away.

Once the film is reduced to flakes, pigments or particles and the template is etched away, at step 26, the particles may be purified. For example, purification may involve washing the particles in distilled way to remove any remaining chemicals. Purification may also include sedimentation of the particles to fractionate them with respect to size of particle. Purification may also include filtration of the particles through a controlled pore-size filter. The particles may further be dried using heat, vacuum, or gas flow, for example using an inert gas such as nitrogen.

The particles may be used as tunable photonic crystal particles (e.g., electrically- or mechanically-tunable particles, depending on the responsive material in the particles), suitable for use in compositions, such as standard ink, coating or paint compositions.

Although the above method of manufacture describes the particles as being ground or milled to a desired size, other methods of obtaining the desired particle size are be possible. For example, the film may be cut up into particles of uniform size and/or regular shape. The film may also be manufactured already in the desired size, so that no or minimal comminution or cutting is required. Manufacture of the film may use a template that is already the desired size.

Composition Formulations

The tunable photonic crystal particles may be incorporated into compositions, such as standard ink or paint compositions, to produce tunable photonic compositions, including ink, coating or paint compositions. The terms "ink", "coating" or "paint" may be used interchangeably, and are intended to cover all inks, coatings, paints, sprays, fluids, dry inks and similar compositions in which the tunable photonic crystal particles may be dispersed.

Such compositions may include components commonly found in standard inks or paints, including a carrier, which may include binders, additives, and solvent. These components may be slightly flexible or elastic when set, to allow the photonic crystal particles to expand and contract in response to external stimulation. These components may be flexible only when expanded by an inflow of solvent or electrolytes.

The carrier is designed to allow tunability of the composition. For example, for an electrically-tunable composition, the carrier (which may include binders, solvents, additives, and other components) may be designed to be electrically conductive. Similarly, for a mechanically-tunable composition, the carrier may be designed to be deformable. The carrier may be relatively transparent or translucent, to avoid interfering with light reaching and reflected from the photonic crystal particles.

The carrier may include an aqueous solution or solvent used in manufacture of the particles (e.g., an aqueous solution or solvent used to grind or mill the particles, or to remove the template). The carrier may also include an additive or a binder. The one or more components of the carrier may be introduced at any step in the manufacture of the photonic crystal particle. For example, the carrier can include an aqueous solution or solvent used in grinding or milling the particles and thus be introduced at the appropriate grinding or milling step. The aqueous solution or solvent may be removed from the carrier after completion of the appropriate grinding or milling step. In some examples, the aqueous solution or solvent is not removed, but is itself part of the carrier in the final composition. This may be the case, for example, where the solution or solvent is dispersed with monomers or pre-polymers in the composition, and the solution or solvent and monomers or pre-polymers are UV-cured to form the polymer network. Such an example embodiment may be free of volatile organic compounds (VOCs).

In some examples, the one or more components of the carrier can penetrate into the pores of the photonic crystal particle, in which case the one or more penetrating components may be designed to preserve periodic modulation of the refractive index in the photonic crystal particle, even after setting or curing.

Example compositions have formulations where the carrier includes a binder and a solver, and the composition contains up to about 10 wt % (weight %) photonic crystal particles, up to about 45 wt % binder, and up to about 45 wt % solvent. Suitable binders include Incorez™ W2600 (from Industrial Copolymers Ltd.), and suitable solvents include ethylene glycol. Optionally, the formulation may include up to about 1 wt % surfactant, such as Zonyl™ 9361 by Dupont. The addition of a surfactant may be desirable to achieve a composition that better wets surfaces, including glass or plastic surfaces.

A simple example formulation can contain just the photonic crystal particles, and a carrier having just a binder and a solvent. The wt % of the particle can range from about 0.1-95%, typically about 10-30%; the wt % of the binder can range from about 0.1-99.9%, typically about 10-30%; and the wt % of the solvent can range from about 0-99.8%, typically about 40-80%. The binder can be a range of polymeric or polymer precursor compounds, in pure form, or dissolved or suspended in a solvent. The solvent can be water.

An example suitable binder is a polymeric resin. Possible binders include those described in the following references: Flick, "Paint & Ink Formulations Database", published by William Andrew, 2005; Bieleman, "Additives for Coatings", published by Wiley, 2000; and Tracton, "Coatings Materials and Surface Coatings", published by CRC Press, 2007. Other additives are described in Fouassier, "Photoinitiated Polymerisation: Theory and Applications", published by Rapra, 1997.

For compositions containing electrically tunable photonic crystal pigments, flakes or particles, one or more components of the carrier in which the particles are dispersed may be electrically conductive. For example, the carrier may be provided with electrical conductivity by the inclusion of, conductive materials such as carbon, metal (e.g., silver), or conductive polymers. Alternatively, the carrier may be provided as a relatively small component of the composition such that the particles are physically in close proximity or in contact with each other, enabling direct electrical conduction among the particles.

For compositions containing mechanically tunable photonic crystal particles, the carrier may be mechanically deformable, such as compressible or flexible. It may be that standard carriers and additives commonly used in inks and paints are sufficiently flexible or compressible for this application without requiring any modification. For example, components typically found in common latex paints may provide sufficient flexibility. Alternatively, the carrier may be provided as a relatively small component of the composition such that even if such components are inflexible or incompressible, suitable pressure may still be transferred to the photonic crystal particles in the cured ink or paint.

Possible additives that may be included in the carrier include surface-active agents, wetting agents such as surfactants, defoamer or anti-foaming agents, pH modifiers, humectants, biocides, thickeners or rheology modifiers, and leveling agents. There may also be curing agents to allow the ink or paint to be cured by drying, UV radiation, or electron-beam radiation. The carrier may include fillers or extenders, such as clays.

EXAMPLES

Examples of tunable photonic crystal particles are described here for the purpose of illustration only. Where the examples are particles, the particles are suitable for use in a composition including a carrier.

Figure 2:
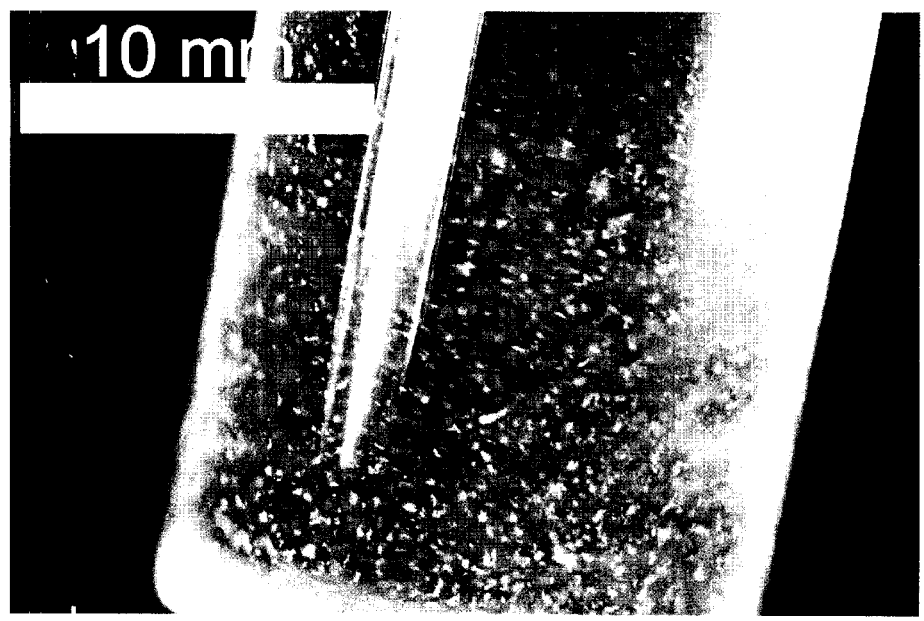
FIG. 2 is an image of example mechanically tunable photonic crystal particles in a liquid suspension.

FIG. 2 shows an image of example mechanically tunable photonic crystal particles in a liquid suspension. The mechanically tunable photonic crystal particles comprise an elastomeric acrylate polymer network, and the particles are suspended in ethanol. Particle sizes mostly fall into the range of about 20-200 µm. Comminution of the particles included the method of dry cryo-milling.

Figure 3:
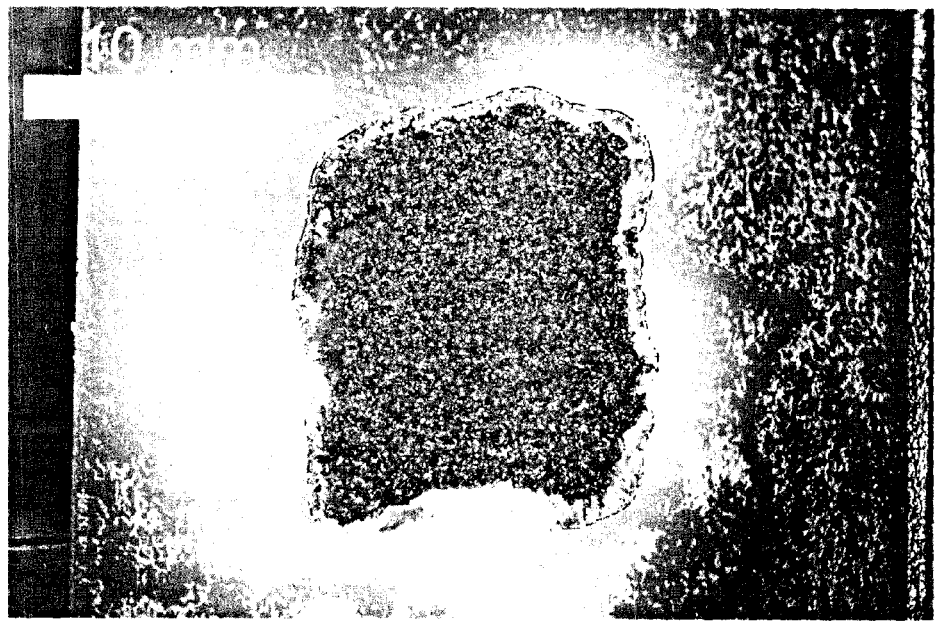
FIG. 3 is an image of example mechanically tunable photonic crystal particles coated with a polymeric binder on a glass substrate.

FIG. 3 shows an image of example mechanically tunable photonic crystal particles coated on a glass substrate. The mechanically tunable photonic crystal particles comprise an elastomeric acrylate polymer network, and the carrier comprises the polymeric binder Incorez™ W2600. Particle sizes mostly fall into the range of about 20-200 µm. Comminution of the particles included the method of dry cryo-milling.

Figure 4:
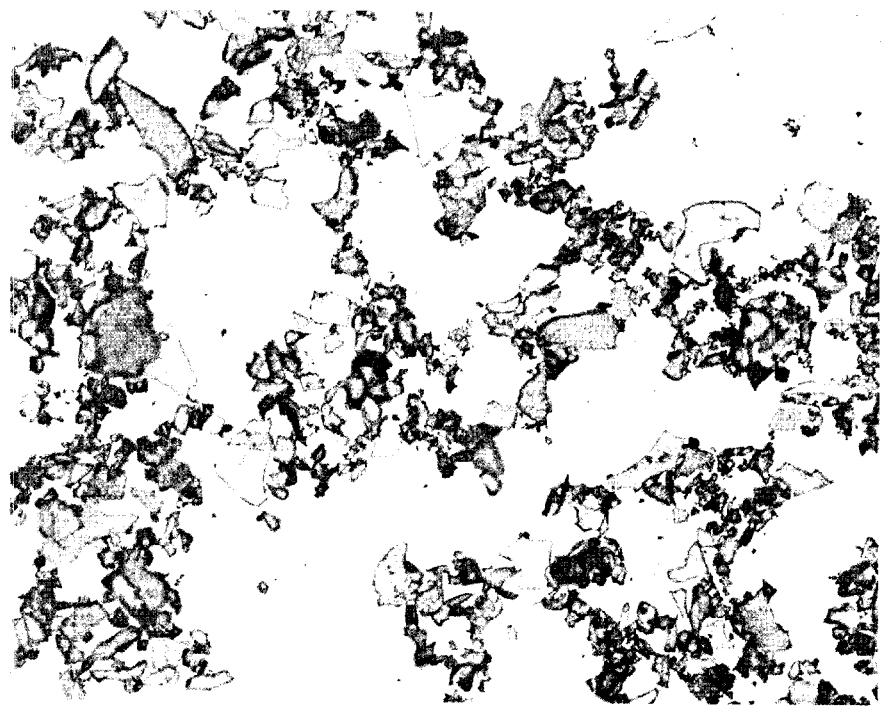
FIG. 4 is an optical microscope image of example mechanically tunable photonic crystal particles.

FIG. 4 shows an optical microscope image of example mechanically tunable photonic crystal particles. The mechanically tunable photonic crystal particles comprise an elastomeric acrylate polymer network, and particle sizes mostly fall into the range of about 20-200 µm. Comminution of the particles included the method of dry cryo-milling.

Figure 5:
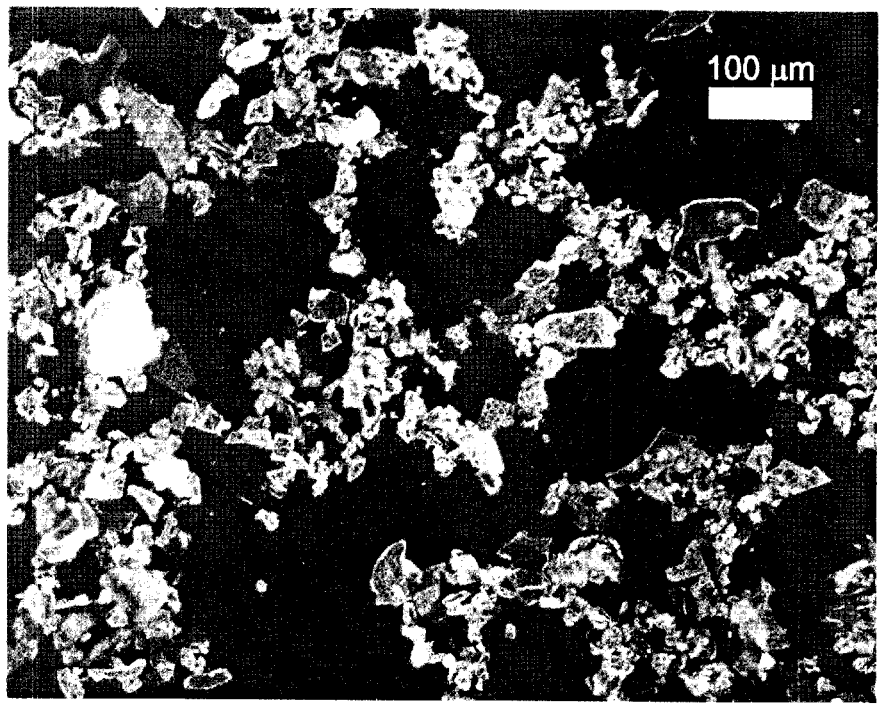
FIG. 5 is a dark-field optical microscope image of example mechanically tunable photonic crystal particles.

FIG. 5 shows a dark-field optical microscope image of example mechanically tunable photonic crystal particles. The mechanically tunable photonic crystal particles comprise an elastomeric acrylate polymer network, and particle sizes mostly fall into the range of about 20-200 µm. Comminution of the particles included the method of dry cryo-milling.

Figure 6:
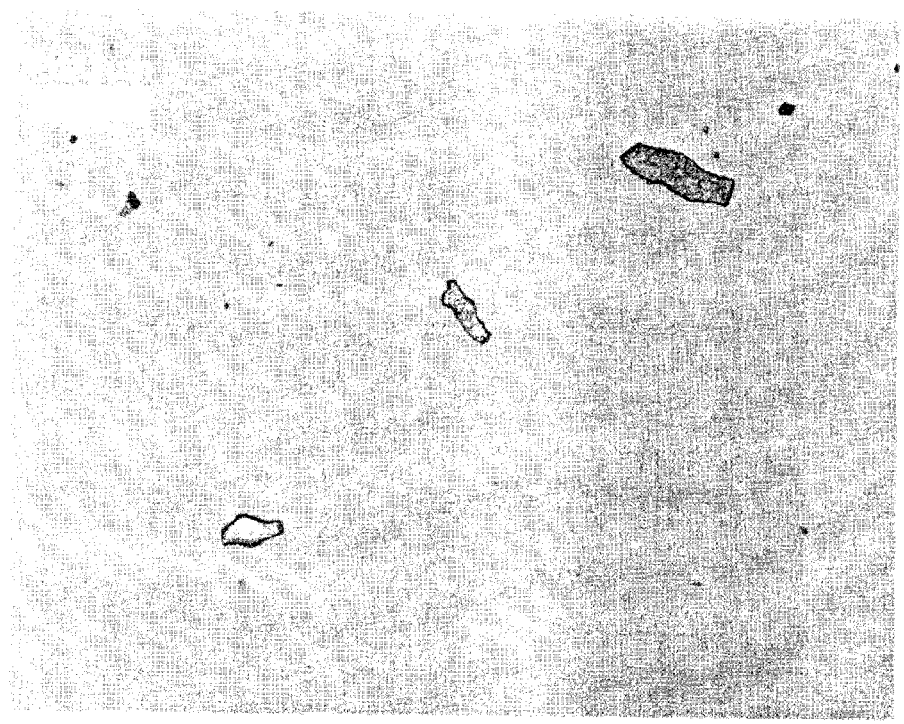
FIG. 6 is a higher resolution optical microscope image of isolated example mechanically tunable photonic crystal particles.

FIG. 6 shows a higher resolution optical microscope image of isolated example mechanically tunable photonic crystal particles. The mechanically tunable photonic crystal particles comprise an elastomeric acrylate polymer network, and particle sizes mostly fall into the range of about 20-200 µm. Comminution of the particles included the method of dry cryo-milling.

Figure 7:
FIG. 7 is an optical microscope image of example electrically tunable photonic crystal particles.

FIG. 7 shows an optical microscope image of example electrically tunable photonic crystal particles. The electrically tunable photonic crystal particles comprise a metal-containing polymer network, and particle sizes mostly fall into the range of about 5-150 µm. Comminution of the particles included the method of ultrasonic treatment, with the particles dispersed in ethanol.

Figure 8:
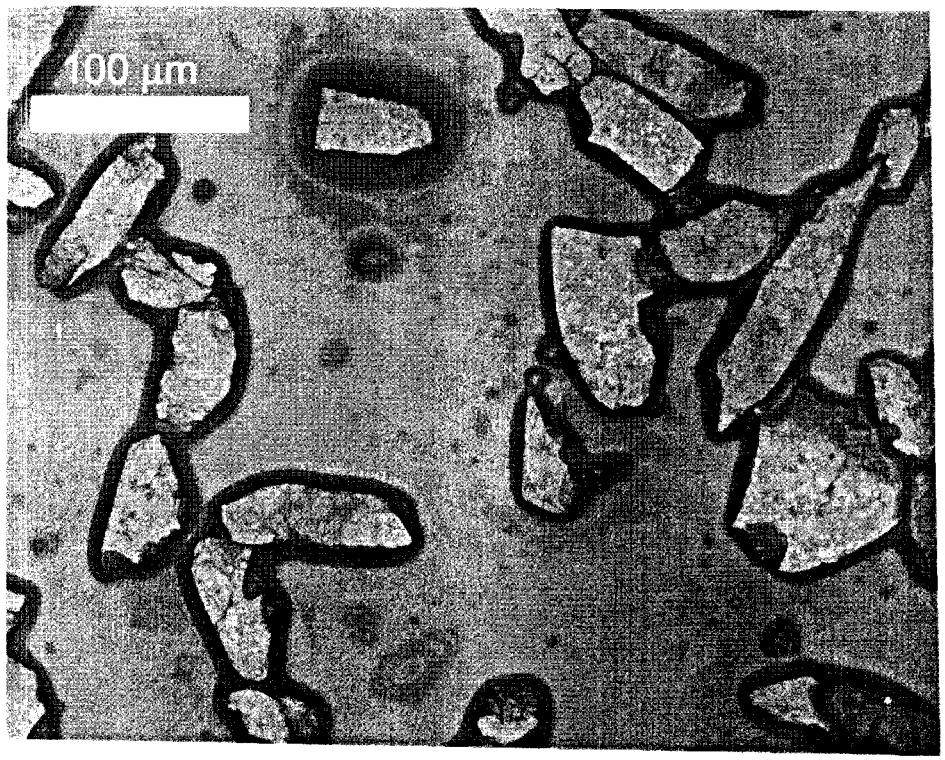
FIG. 8 is an optical microscope image of example electrically tunable photonic crystal particles after purification by sedimentation.

FIG. 8 shows an optical microscope image of example electrically tunable photonic crystal particles after purification by sedimentation. The electrically tunable photonic crystal particles comprise a metal-containing polymer network, and particle sizes mostly fall into the range of about 25-100 µm. Comminution of the particles included the method of ultrasonic treatment, with the particles dispersed in ethanol.

APPLICATION

The tunable photonic crystal composition containing tunable photonic crystal particles may be applied to a surface the same way as a standard ink, coating or paint. They may be suitable for conventional printing processes such as lithography or offset process, flexography, gravure printing, screen printing, pad printing, letter press, and digital printing. The particles may also be applied by spraying, printing, dipping, coating, and other common methods.

The composition containing the tunable photonic crystal particles may be designed to have additives and properties (e.g., viscosity and drying efficiency) suitable to a specific printing or application process.

Providing the tunable photonic crystal in the form of a composition such as an ink, a coating or a paint may simplify or enable application of a photonic crystal film to a large surface area, or to uneven surfaces. The tunable photonic crystal composition may be used in applications in which tunable photonic crystals may be used, including cosmetics, decorative surfaces, infrared reflectors, and displays. The tunable photonic crystal composition may be controlled the same way as a tunable photonic crystal in the same applications. In addition, because the tunable photonic crystal composition may provide a wider viewing angle than a conventional tunable photonic crystal, the tunable photonic crystal composition may be useful in applications in which a conventional tunable photonic crystal is less desirable, for example in large displays where a wide viewing angle is desirable.

For an electrically tunable photonic crystal composition, such as an ink, a coating or a paint, the composition may be applied on an electrode or other electrically-conductive substrate, which may provide electrical stimulation to the photonic crystal particles. The particles may be in direct contact with the electrode in order to receive the electrical stimulation, or may be suspended in an electrically conductive carrier or binder. The particles may be in contact with or in close proximity to each other, to aid in conduction of the electrical stimulation.

A mechanically tunable photonic crystal composition may have no limitation on the type of substrate to which it is applied.

The applied composition may be provided with a protective cover or coating. The protective cover or coating may be relatively transparent or translucent, to permit light to reach and be reflected from the photonic crystal particles. Where the photonic crystal composition is mechanically tunable, the protective cover or coating may be flexible or compressible, for example to allow compression of the mechanically tunable photonic crystal particles.

The tunable photonic crystal particles may be applied in the form of a composition such as an ink, a coating or a paint, or the particles themselves may be directly applied to the desired surface, and subsequently fixed to the surface.

Possible applications for the tunable photonic crystal composition include use as a counterfeit or security ink, for example when printed on labels, packaging, cards or documents such as banknotes or credit cards. The tunable photonic crystal composition may also provide an efficient method of creating photonic crystal-based displays by applying the particle to electrodes on a display surface. Other applications include use as an ink, coating or paint for aesthetic purposes, for example for painting walls. The tunable photonic crystal composition can also be used in an ink in conventional printing. Other applications include use as a coating for use in displays, tunable color architectural features (e.g., walls, partitions, ceilings, floors), tunable color products and accessories, tunable control of solar infrared for heat-management coatings, tunable infrared filters for military use, pressure gauges, decorative coatings, and many others.

The tunable photonic crystal particle, when provided in a composition, such as an ink, a paint or a coating, may provide advantages over conventional photonic crystal films. The less-ordered configuration of particles in the composition may provide detectable reflectance over a wider angle of view. It may be cheaper and easier to apply to a surface, for example by spraying or printing processes similar to conventional inks, as well as being more adaptable to conventional manufacturing practices. The composition may allow for greater flexibility and less waste in the design of a photonic crystal image. For example, in a banknote, the photonic crystal composition can be applied in an intricate design (e.g., by printing) rather than a simple strip or patch, with less waste because the design need not be cut out or transferred off from a larger film. The tunable photonic crystal composition may also be easier to transport, and more robust against damage from repeated handling during manufacture.

Although the disclosure includes references to particular examples and embodiments, these are for the purpose of illustration only and are not intended to be limiting. The method of the disclosure is not limited by the order of steps, and the order of steps provided here is for the purpose of illustration only. It will be understood that variations and modifications not described here are included in the scope of the disclosure and would be clear to a person skilled in the art. All references and documents referred to are hereby incorporated by reference in their entirety.

What is claimed is:

1. A tunable photonic crystal composition comprising:
   particles of a tunable photonic crystal, each particle having a polymer network with a periodic modulation of refractive indices, the polymer network having a reflectance wavelength, wherein the periodic modulation of refractive indices is responsive to an external stimulus and the reflectance wavelength is shifted in response to the external stimulus, the particles of the tunable photonic crystal having an average particle size between about 1 μm and 200 μm; and
   at least one carrier in which the particles are dispersed, which is selected from the group consisting of: a binder, a solvent, an additive, a filler, and a curing agent,
   wherein in response to application of the external stimulus, a reflected wavelength of at least a portion of the composition shifts from a first reflected wavelength to a second reflected wavelength due to shifting of the reflectance wavelength of the polymer networks of said particles of the tunable photonic crystal.

2. The composition of claim 1 wherein the periodic modulation expands or contracts in response to the external stimulus.

3. The composition of claim 1 wherein the periodic modulation of refractive indices arises from a three-dimensional ordered array of voids in the polymer network.

4. The composition of claim 1 wherein the periodic modulation of refractive indices arises from periodic multilayer of material having different refractive indices.

5. The composition of claim 1 wherein the polymer network is an electrically active polymer network comprising an electroactive polymer, and the external stimulus comprises an electrical stimulus.

6. The composition of claim 5 wherein the electroactive polymer is selected from the group consisting of: polyferrocenylsilanes, polythiophenes, polypyrroles, polyanilines, polyphenylene vinylenes, polyacetylenes, polyfluorenes, polyphenylenevinyidenes, polyacetylenes, conducting polymers, conjugated polymers, metallopolymers, copolymers incorporating such polymer types, polyvinylidene difluoride, and combinations thereof.

7. The composition of claim 5 wherein the polymer contains cross-links selected from the group consisting of: covalent bonds, ionic bonds, polar covalent bonds, chemical bonds, physical bonds, dispersion interactions, Van Der Waals interactions, nanoparticle interactions, surface interactions, hydrogen bonds, coordination bonds, electrostatic interactions, hydrophobic interactions, fluorophobic interactions, phase-separated domains, or combinations thereof.

8. The composition of claim 5 wherein the polymer contains cross-links that are electrically conducting or electrically insulating.

9. The composition of claim 5 wherein the polymer comprises redox active groups.

10. The composition of claim 1 wherein the polymer network is an elastic polymer network comprising an elastic polymer, and the external stimulus comprises a mechanical stimulus.

11. The composition of claim 10 wherein the polymer is selected from the group consisting of: polystyrenes, polymethacrylates, polyacrylates, polyurethanes, polyesters, polyethylenes, polypropylenes, polyvinylchlorides, polyisoprene, polybutadiene, polydienes, waxes, and copolymers or combinations thereof.

12. The composition of claim 10 wherein the polymer is an elastomer having a monomer or pre-polymer selected from the group consisting of: methacrylic acid esters, acrylic acid esters, polyisoprene, polybutadiene, polyurethane precursors, crosslinkable polyethers, and mixtures thereof.

13. The composition of claim 12 wherein the monomer or pre-polymer is the methacrylic acid ester, and the methacrylic acid ester is selected from the group consisting of: ethylhexyl methacrylate, lauryl methacrylate, butyl methacrylate, methyl methacrylate, stearyl methacrylate, butoxyethyl methacrylate, and mixtures thereof.

14. The composition of claim 12 wherein the monomer or pre-polymer is the acrylic acid ester, and the acrylic acid ester is selected from the group consisting of: butoxyethyl acrylate, hydroxyethyl acrylate, 2-carboxyethyl acrylate, stearyl acrylate, lauryl acrylate, butyl acrylate, hexyl acrylate, and mixtures thereof.

15. The composition of claim 12 wherein the monomer or pre-polymer is the crosslinkable polyether, and the crosslinkable polymer is selected from the group consisting of: polyether diacrylates, polyether acrylates, polyether dimethacrylates, polypropylene glycol diacrylates, polypropylene glycol dimethacrylates, polypropylene glycol acrylates, polypropylene glycol methacrylates, polyethylene glycol diacrylates, polyethylene glycol dimethacrylates, polyethylene glycol acrylates, polyethylene glycol methacrylates, oligoethylene glycol diacrylates, oligoethylene glycol dimethacrylates, oligoethylene glycol acrylates, oligoethylene glycol methacrylates, oligopropylene glycol diacrylates, oligopropylene glycol dimethacrylates, oligopropylene glycol acrylates, oligopropylene glycol methacrylates and mixtures thereof.

16. The composition of claim 1 further wherein the composition comprises the additive and the additive is selected from the group consisting of: a surfactant, an anti-foaming agent, a surface-active agent, a leveling agent, a curing initiator, a pH modifier, a humectant, a wetting agent, a biocide, a rheology modifier, a filler, an electrically-conductive agent, and combinations thereof.

17. The composition of claim 1 wherein the carrier comprises at least one electrically-conductive component.

18. The composition of claim 1 wherein the carrier comprises at least one mechanically-deformable component.

19. The composition of claim 1 wherein the carrier comprises the binder and the solvent, and the composition comprises the particles of tunable photonic crystal in the range of about 10 wt % to about 30 wt %, the binder in the range of about 10 wt % to about 30 wt %, and the solvent in the range of about 40 wt % to about 80 wt %.

20. The composition of claim 19 wherein the carrier comprises the binder and the solvent, and the composition comprises up to about 10 wt % of the particles of tunable photonic crystal, up to about 45 wt % of the binder, and up to about 45 wt % of the solvent.

21. The composition of claim 19 wherein the carrier further comprises a surfactant and the composition further comprises up to about 5 wt % of the surfactant.

22. The composition of claim 1 wherein the external stimulus is selected from the group consisting of: a mechanical stimulus, a chemical stimulus, and an electrical stimulus.

23. The composition of claim 1 wherein the composition is an ink, a coating, or a paint.

24. The composition of claim 1 wherein the composition is suitable for application on an electrode surface.

* * * * *